INVENTORS:
JOHN P. LAVASH
RAYMOND L. WILLIAMS
DANA D. FREBERG
WILLIAM R. SPENCER

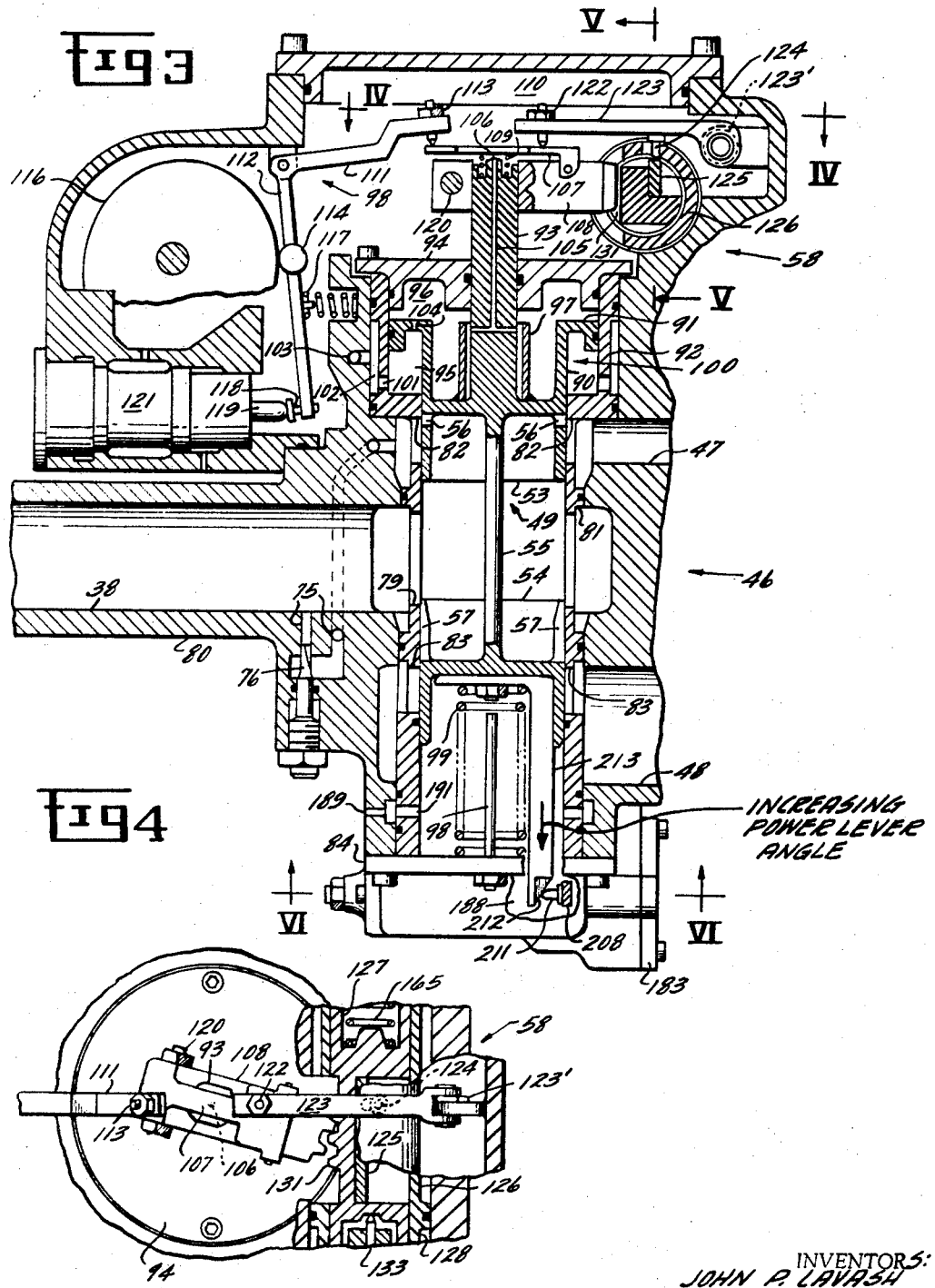

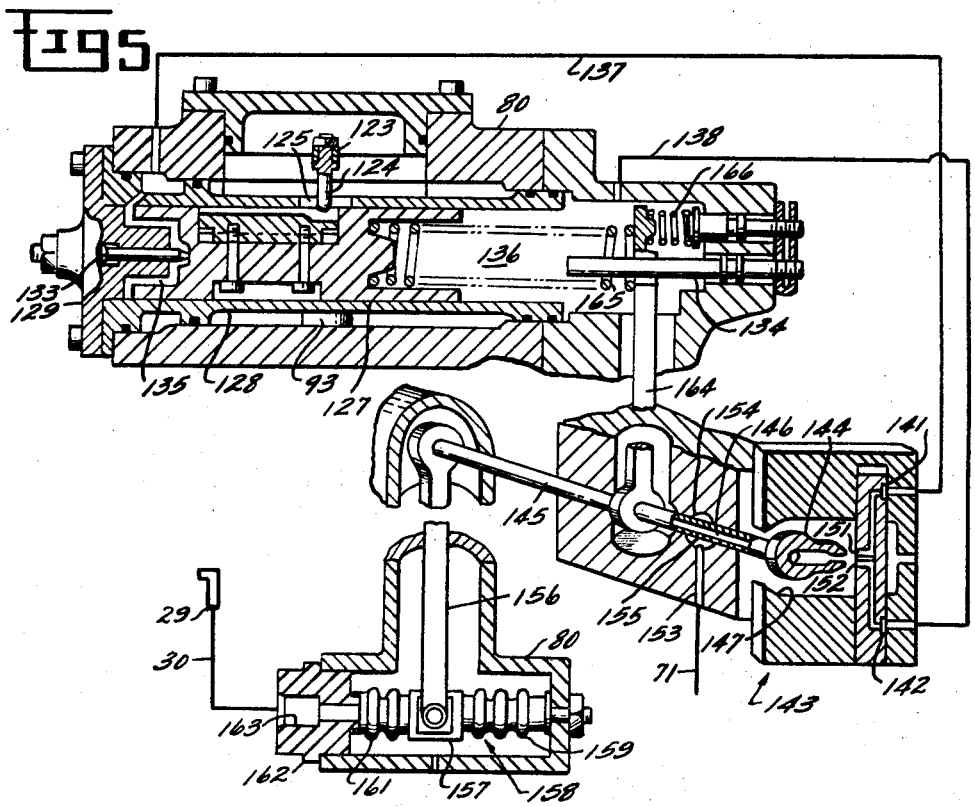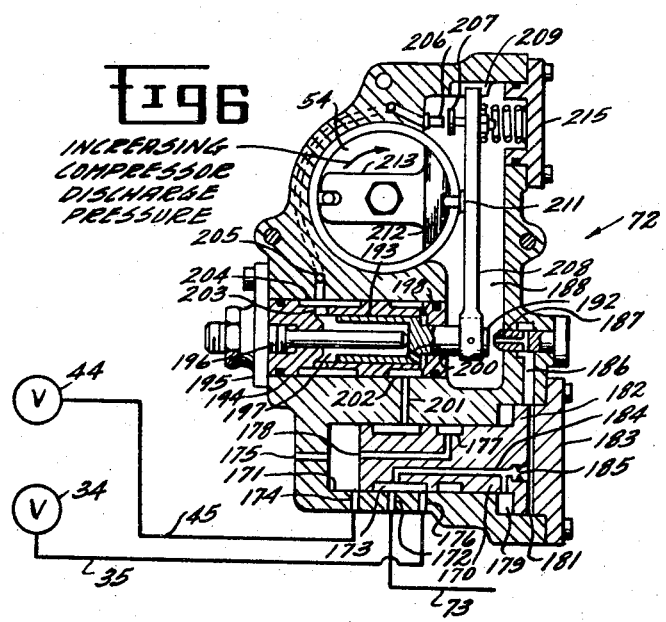

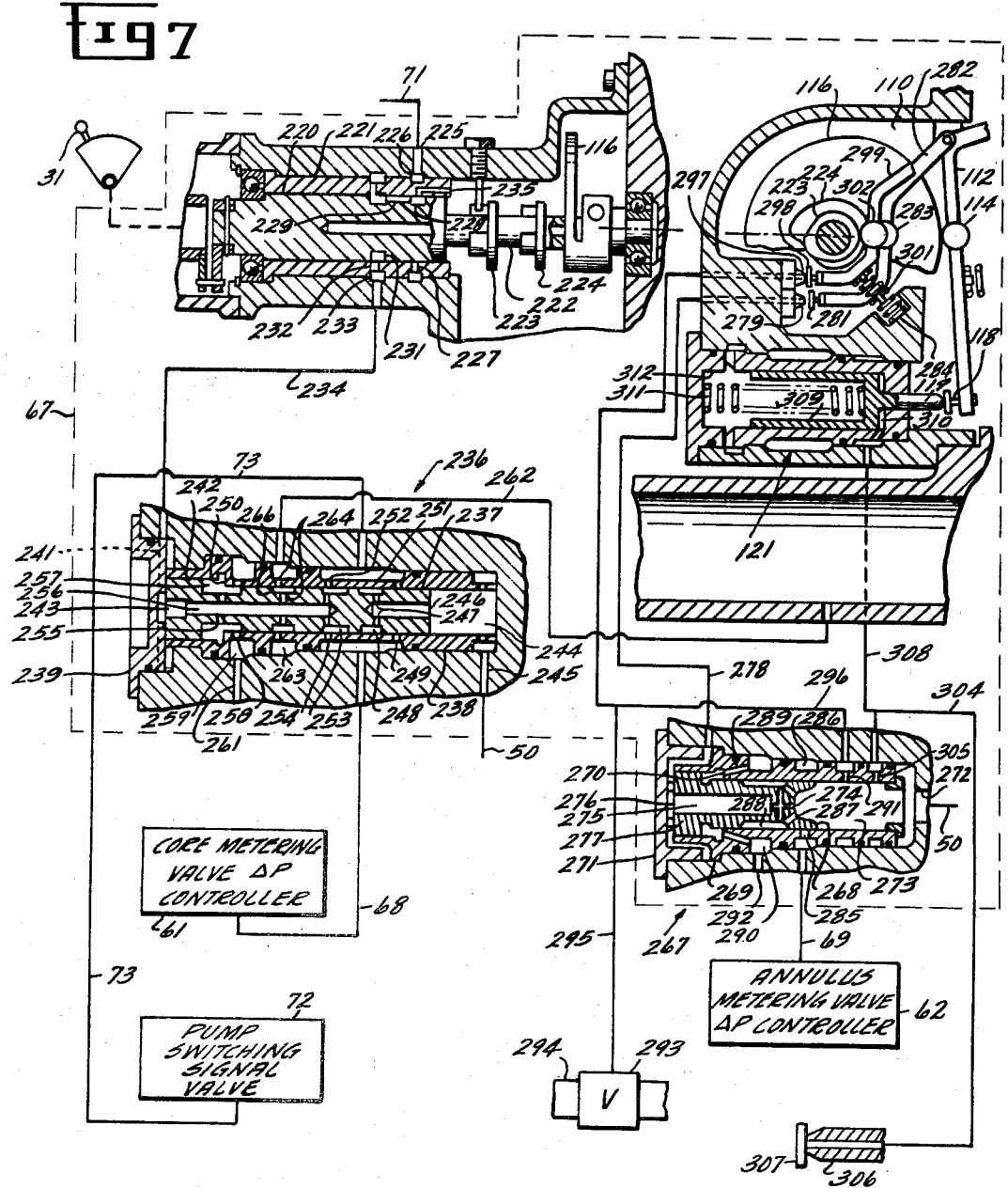

3,402,556
FUEL CONTROL SYSTEMS FOR GAS TURBINE ENGINES

John P. Lavash, Raymond L. Williams, Dana D. Freberg, and William R. Spencer, Cincinnati, Ohio, assignors to General Electric Company, a corporation of New York
Filed Feb. 24, 1967, Ser. No. 618,429
20 Claims. (Cl. 60—241)

ABSTRACT OF THE DISCLOSURE

The disclosure shows an improved fuel control system for a gas turbine engine 10 having a main gas generator 17 and an afterburner 18. The fuel control system comprises main and afterburner fuel pumps 22, 32 to pressurize fuel for delivery to respective fuel scheduling units 24, 39 which control the flow of fuel to the main gas generator 17 and afterburner 18 as a function of operator demand and air flow through the engine. During high operator demand and high air flow through the engine 10, the main pump 22 supplies fuel to the main gas generator 17 and the afterburner fuel pump 32 supplies fuel to the afterburner 18. When the operator demand is high and the air flow through the engine is relatively low, flow from the afterburner pump 32 is terminated and the output of the main pump 22 is connected to the afterburner fuel scheduling unit 39 by a valve switching assembly 34, 44, 72. Therefore, the amount of fuel pressurized to supply the flow requirements of the engine during this condition is minimized.

---

The invention described and claimed in the United States patent application herein resulted from work done under United States Government contract FA-SS-65-17. The United States Government has an irrevocable, non-exclusive license under said application to practice and have practiced the invention claimed herein, including the unlimited right to sublicense others to practice and have practiced the claimed invention for any purpose whatsoever.

The present invention relates to fuel control systems and more specifically to improvements in fuel control systems used in gas turbine engines.

High performance gas turbine engines may comprise a main gas generator for producing primary propulsive thrust and an afterburner for producing increased propulsive thrust. These components are supplied with fuel for combustion by a fuel control system which comprises a main and afterburner fuel pump driven by the rotor of the gas turbine engines to pressurize fuel for delivery to separate fuel scheduling units. The fuel scheduling units control fuel flow to fuel nozzles in the main gas generator and afterburner primarily as a function of the position of an operator controlled power lever. Additional control inputs reflecting engine operating parameters are generally provided to the fuel scheduling units so that the resultant fuel flow to the engine is dependent upon the power lever position and the air flow through the engine. The fuel scheduling units are coordinated so that the afterburner operates only after the main gas generator is producing a maximum thrust output and its rotational speed is maximum.

When the gas turbine engine is used to power an aircraft, the variation in fuel flow to achieve the desired thrust outputs of the engine during normal afterburner operation may vary substantially. The fuel flow varies as a function of the change of power lever position but a substantial change results from a change in air flow through the engine. This change in air flow through the engine is primarily related to the altitude at which the aircraft is operating, lower altitudes resulting in a higher air flow through the engine. Generally, the aircraft requires a maximum power and maximum fuel flow for a takeoff. At this point, the power lever position is nearly maximum and the air flow through the engine is at a maximum. However, at higher altitudes, with substantially equivalent power lever positions, the air flow through the engine is reduced substantially. As a result, the fuel flow to the main gas generator and the afterburner is reduced. Since the fuel pumps are designed to have a maximum capacity output at takeoff, operation of the engine at altitude results in a substantial excess of fuel being pressurized by the fuel pumps. Generally, this excess fuel is throttled to a low pressure point to maintain the output of the pumps at a level sufficient to supply the flow requirements of the fuel scheduling unit. The throttling of the fuel to the low pressure point generates a heat input to the fuel and reduces the effectiveness as a cooling medium for other fluids and other components of the aircraft. While during normal conditions, the heat input to the fuel is tolerable, sustained high speed cruising at altitude may generate substantial amounts of heat input which can eventually reduce the ability of the fuel to act as a heat exchange medium.

Accordingly, it is an object of the present invention to provide a highly effective simplified fuel control system which minimizes the heat input to the fuel supplied to a main gas generator and an afterburner of a gas turbine engine.

The above ends are achieved in a gas turbine engine providing a fluid flow path through a compressor, combustor and afterburner. A fuel control system is provided which comprises first fuel pressurizing means and means for scheduling fuel from the first fuel pressurizing means to the combustor. Second fuel pressurizing means are provided as are means for scheduling fuel to the afterburner. Means are provided for connecting said first pressurizing means to said afterburner fuel scheduling means at low combined combustor and afterburner flow requirements and connecting said second pressurizing means to said afterburner schedule at high combined fuel requirements. The amount of fuel pressurized by said second pressurizing means therefore is minimized, which greatly minimizes heat input to the fuel.

It is another object of the present invention to provide a highly effective and simplified valve means for generating control output signals from a band of input signals, the valve means being particularly adaptable for the above fuel control system.

The above ends are achieved by providing apparatus for generating an output signal in response to a band of displacement input signals.

The apparatus comprises control valve means displaceable between a first position and a second position. Means responsive to displacement of the control valve between said first and second positions are provided for generating an output signal. Reset valve means are disposed in said housing and displaceable between two positions. Means responsive to displacement of the reset valve means between the positions are provided for displacing the valve element between the first and second positions.

A lever is pivotally mounted at one end to the reset valve means, the lever receiving a displacement input intermediate its ends. Means responsive to displacement of the opposite end of the lever are provided for displacing the reset valve means between the two positions. The means are positioned so that a predetermined displacement input in one direction causes the opposite end of the lever to pivot and actuate the reset valve displacement means to displace the reset valve from one position to another, and displace the valve element from the first position to the second position for generating the output signal. The lever is pivoted about said intermediate point by displacement of said reset valve means in such a manner that a second predetermined displacement input in the opposite direction causes the free end of the lever to be displaced and the valve element displaced to the first position for terminating the output signal. The signal generating apparatus, therefore, is responsive to a band of displacement inputs.

The above and other related objects and features of the present invention will be apparent from a reading of the following description of the disclosure found in the accompanying drawing and the novelty thereof pointed out in the appended claims.

In the drawings:

FIGURE 3 is a detailed longitudinal section view of a portion of the fuel control system of FIGURE 1.

FIGURE 4 is a view taken on line IV—IV of FIGURE 3.

FIGURE 5 is a view taken on line V—V of FIGURE 3.

FIGURE 6 is a view taken on line VI—VI of FIGURE 3.

FIGURE 7 is a detailed view of another portion of the fuel control system shown in FIGURE 1.

Figure 1:
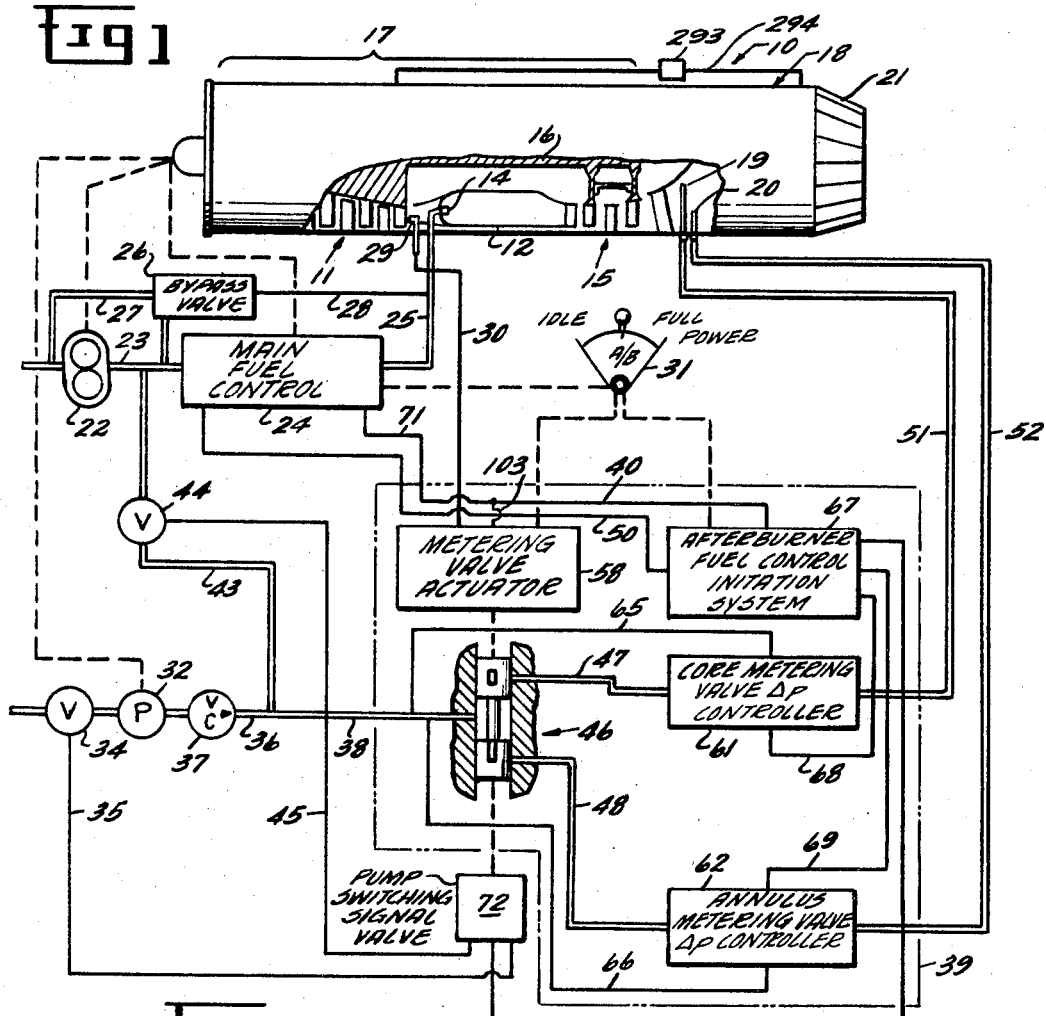
FIGURE 1 is a highly simplified showing of a gas turbine engine along with a fuel control system embodying the present invention.

Reference is had to FIGURE 1 which shows in simplified fashion, a fuel control system for a gas turbine engine 10. The engine 10 comprises a compressor 11 which pressurizes inlet air for discharge to a combustor 12. Fuel is injected into the combustor 12 through a series of fuel nozzles 14 and the resultant fuel-air mixture is ignited by well known means to generate a hot gas stream. The hot gas stream is then discharged from the combustor through a turbine 15 where a portion of the energy from the hot gas stream is used to drive the compressor 11 through an interconnecting shaft 16.

The compressor 11, combustor 12 and turbine 14 combine to form a main gas generator 17. The hot gas stream is discharged from the main generator 17 through an afterburner 18 and a variable area exhaust nozzle 21 to produce a propulsive thrust for the engine 10. The afterburner 18 is selectively actuated by injecting fuel into the hot gas stream through core fuel nozzles 19 or annulus fuel nozzles 20. The resultant fuel-gas mixture is ignited to increase the energy level of the hot gas stream to provide an increased propulsive force for the engine 10.

The fuel nozzles 14 of the combustor 12 are supplied by a main fuel system which comprises a positive displacement pump 22, continuously driven by the rotor of the engine 10. The fuel pump 22 receives fuel from a fuel tank (not shown) and pressurizes it for delivery through a supply conduit 23 to a main fuel control 24, which schedules flow of fuel to the nozzle 14 through a nozzle supply conduit 25. In the usual instance it is desirable, if not essential, that a constant pressure drop be maintained across the main fuel control 24, or at least the metering valve thereof. To this end, a valve assembly 26, interposed in a conduit 27 extending from the conduit 23 to the inlet of the pump 22, regulates the pressure in conduit 23, in response to pressure signals from the conduit 25 through a pressure sensing conduit 28, to maintain a constant pressure differential across the main fuel control.

The main fuel control 24 may be a well known type which, in steady state operation, regulates the amount of fuel flowing through the combustor 12 to maintain a desired engine rotor rate of rotation as a function of the position of a pilot controlled power lever 31. To this end, it will be seen that mechanical connections are provided from the power lever 31 and the engine rotor to the main fuel control 24. Other parameters limiting flow during acceleration and deceleration may also be employed, but are not essential to an understanding of the present invention.

Afterburner operation is initiated in response to movement of the power lever 31 beyond a given position which establishes the fuel flow to the main combustor 12, sufficient to give a maximum speed to the engine rotor, usually referred to as 100% speed. When the power lever position is advanced beyond the position indicated on the drawing by A/B, and when the engine rotor actually attains 100% speed, the main fuel control 24, through well known means, generates a permissive fluid pressure signal which is transmitted to an afterburner fuel control 39, via a conduit 71, which enables the afterburner fuel control 39 to schedule fuel to the afterburner fuel nozzles 19 and 20 through supply conduits 51 and 52 respectively. As will later be more fully apparent, the afterburner fuel control 39 schedules flow of fuel to the nozzles 19 and 20 as a function of the power lever position and as a function of the discharge pressure of the compressor 11. The compressor discharge pressure level is provided by a pressure sensor 29 and transmitted to the afterburner fuel control 39 via a conduit 30.

The afterburner fuel control 39 may be supplied with pressurized fuel from either an afterburner pump 32 through a supply conduit 36 or from the main fuel pump 22 through an interconnecting conduit 43. The source of fuel for the afterburner fuel control 39 is controlled by a pump switching valve 72 which selectively pressurizes shut-off valves 44 and 34 respectively interposed in the conduits 43 and 36. The valve 72 is supplied with pressurized fluid for this control purpose by a conduit 73 extending to the afterburner fuel control 39. The pump switching valve 72 pressurizes a conduit 45 to open valve 44 and depressurize a conduit 35 to close valve 34 to permit flow to the afterburner fuel control from the main fuel pump 22 during conditions of low scheduled fuel flow to the afterburner 18. A check valve 37, disposed in conduit 36, prevents back flow of fuel during this condition. When there is a high fuel flow scheduled to the afterburner 18, the valve 72 depressurizes the conduit 45 to close valve 44 and pressurizes conduit 35 to open valve 34, thereby permitting flow to the afterburner fuel control from the afterburner fuel pump 32. The pump switching signal valve 72 receives a signal input from the afterburner fuel control 39 which reflects the total flow to the afterburner 18 to enable selective operation on the afterburner or main fuel pump, as thus briefly described and more fully described hereinafter.

The afterburner fuel control 39 comprises an inlet passageway 38 which receives pressurized fuel from the supply conduit 36 and delivers it to a dual metering valve assembly 46, which schedules flow of fuel to passageways 47 and 48 extending to the nozzle core and annulus nozzle supply conduits 51 and 52 respectively. The amount of fuel scheduled by the metering valve 46 is controlled by a metering valve actuator 58 through a suitable connection, to be described later. The metering valve 46 is of the multiplying type which varies fuel flow as a function of both rotary and linear inputs thereto. The metering valve actuator 58 provides these two types of inputs, one input being a function of the pressure of the air discharged from the engine compressor 11 which is sensed through the conduit 30 and the other input being a function of an annular position of the power lever 31 as provided by the mechanical connection between the power lever and the metering valve actuator 58.

Again, as in the case of most metering valves, it is necessary to maintain a constant pressure differential thereacross. For this purpose, a pair of metering valve differential pressure controllers 61, 62 are respectively interposed in the outlet passageways 47, 48. The controllers 61, 62 may be throttling valves which provide a variable restriction to flow in response to pressure signals from the outlet passageways 47, 48 and the inlet passageway 38 through passageways 65, 66. The variable restriction to flow thus enables a constant pressure differential to be maintained across the metering valve assembly 46. The throttling valves of the differential pressure controllers 61, 62 are normally closed to prevent flow through passageways 61, 62 and are activated to an operating condition by fluid pressure signals from conduits 68, 69.

As was indicated above, afterburner operation is established only after the power lever 31 is moved beyond a certain predetermined position and the speed of the engine rotor is 100%. When this condition is reached, the pressure signal from conduit 71 and the power lever position input are transmitted to the metering valve actuator 58 to enable it to position valve 46 for scheduling of a desired or demanded amount of fuel to the outlet passageways 47 and 48.

The same signal inputs are transmitted to an afterburner fuel control imitation system 67 by mechanical connections from the power lever 31 and a passageway 40 extending from conduit 71. These signal inputs enable the afterburner fuel control initiation system 67 to direct a constant pressure fluid from a convenient source, such as the main fuel control 24 via a conduit 50 to the conduit 73 for the pump switching valve 72. Thus, when afterburner operation is initiated, the pressurized fluid from conduit 50 is supplied to the pump switching valve 72 to enable operation of pump 32 or 22 responsive to the demanded fuel flow to the afterburner 18. The augmenter fuel control initiation system 67 also selectively directs pressurized flued to the core and annulus metering valve ΔP controllers 61 and 62 through conduits 68, 69 when flow is scheduled through the outlet passageways 47 and 48 by the metering valve assembly 46. The afterburner fuel control initiation system 67 may also be employed to generate control signals for other purposes which will be discussed later.

Reference is now had to FIGURES 3, 4 and 5 which illustrate, in detail, the metering valve assembly 46 and the metering valve actuator 58. The metering valve assembly 46 (FIGURE 3) includes metering valve 49 comprising core and annulus metering pistons 53 and 54 interconnected by a shaft 55 and displaceable in a sleeve 81. The inlet passageway 38 extends to a chamber 49' through a plurality of inlet ports 79 in the sleeve 81. A series of rectangular ports 56, and rectangular notches 57, respectively formed in the skirts of the core and annulus metering pistons 53, 54 and cooperate with rectangular outlet ports 82 and 83 in the sleeve 81 to form variable area orifices for scheduling flow of fuel to the core and annulus outlet passageways 47, 48. The ports 56 and notches 57 are positioned so that at low flow rates, only the core fuel nozzles 19 are supplied with fuel and at high flow rates, both the core and annulus nozzles 19 and 20 are supplied.

A passageway 75 extends from the inlet passageway 38 to the core outlet passageway 47 to bypass the core metering piston 53. A plunger assembly 76 threaded into the housing 80 is displaceable into the passageway 75 for providing a variable restriction to flow therethrough. The position of the plunger assembly 76 in the passageway 75 is varied to adjust the minimum flow level to the core fuel nozzles 19 at all times independent of the flow ratio between the core and annulus metering pistons 53 and 54.

The metering valve actuator 58 includes a piston assembly 100 (FIGURE 3) comprising a sleeve 90 and a flange 91 which extends from the end of the metering piston 53 and is displaceable in a sleeve 92 integral with the sleeve 81. A plunger 93 secured to the metering valve piston 53 extends through an end cap 84 secured to housing 80. The flange 91 divides the interior of sleeve 92 into variable volume chambers 95 and 96 which are pressurized to linearly displace the metering valve 49.

A sleeve 97 extending from the metering piston 53 and a stop 98 bolted to an end cap 84 limit the linear displacement of the core and annulus metering valve pistons 53, 54 in opposite directions. A light spring 99 acting against the end cap 84 and the metering piston 54 urges the metering valve 49 to a closed position.

Constant pressure fluid is applied to the chamber 95 through an inlet port 101, annular chamber 102 and a conduit 103 which extends to the constant pressure fluid supply conduit 71 (FIGURE 1). An orifice 104 (FIGURE 3) formed in the flange 91 provides a bleed flow path for fluid from the chamber 95 to the chamber 96. A passageway 105 in the plunger 93 provides a flow path for pressurized fluid from the chamber 96 through an outlet port 106 to a low pressure return chamber 110 in the housing 80. A flapper valve 107 is pivotally mounted on a sector gear 108 (see also FIGURE 4) which is secured to the end of the plunger 93 by a bolt 120. A spring 109, acting against the plunger 93, urges the flapper valve 107 away from the outlet port 106.

The flapper valve 107 receives a first displacement input from an L-shaped lever 98 comprising arms 111 and 112 pivotally mounted to the housing 80. An adjustable screw 113 on arm 111 of the lever 98 engages the flapper valve 107 as controlled by a follower 114, on arm 112, which rides on a cam 116, journaled in the housing 80. A button 118, on the end of arm 112, engages a plunger 119 of a valve assembly 121 to be discussed later. The follower 114 and button 118 are urged against the cam 116 and plunger 119 by a spring 117. The cam 116 receives rotational displacement inputs from the pilot controlled power lever 31 (FIGURE 1).

The flapper valve 107 receives a second displacement input from a lever 123 which is pivotally secured to the housing 80. A torsion spring 123 urges a pin 124 (on lever 123) into engagement with a plate cam 125 (see also FIGURE 5) causing a screw 122, at the outer end of lever 123 to bear against lever 107.

The plate cam 125 is secured to a piston assembly 126 (FIGURES 4 and 5) comprising a piston 127 displaceable in a sleeve 128 which is secured in the housing 80 by an end cap 129. A rack 131, formed on the piston 127, meshes with the sector gear 108 which extends through and opening in the sleeve 128. The piston 127 is displaceable between adjustable stops 133 and 134 (FIGURE 5) secured to the end cap 129 and the housing 80 respectively. The piston 127 is displaced by fluid pressure variations in chambers 135 and 136 formed on opposite ends of the piston 127. Passageways 137 and 138 extend from chambers 135 and 136 respectively to passageways 141 and 142 of a jet pipe servo valve 143.

The jet pipe servo valve 143 comprises a nozzle 144 secured to a rotatable shaft 145, for discharging a pressurized fluid power stream from a passageway 146 through a low pressure chamber 147 at a pair of receiver ports 151 and 152. The passageway 146 is supplied with constant pressure fluid from the conduit 71 extending to the main fuel control 24 (FIGURE 1) through a passageway 153, an annular chamber 154, and a port 155 in the shaft 145.

The shaft 145 has an arm 156 extending from the opposite end thereof to a pivotal mounting on a center portion 157 of a differential pressure bellows assembly 158. An evacuated bellows 159 extends from one end of the center portion and is secured to the housing 80. A second bellows 161 is secured to the opposite end of the center portion to an end cap 162. A passageway 163 provides a flow path from the compressor discharge pressure sensor conduit 30 to the bellows 161.

A second arm 164 is secured to the shaft 145 and extends into chamber 136. A feedback spring 165 acts against the arm 164 and the piston 127. A return spring 166 acts between the opposite side of arm 164 and the housing 80.

Reference is now had to FIGURE 3 and particularly to FIGURE 6 which illustrate the pump switching valve 72. The pump switching valve 72 comprises a control piston 170 displaceable in a bore 171 in the housing 80.

A passageway 172 in the housing 80 directs constant pressure fluid from the conduit 73 to an annular groove 173 formed in the control piston 170. The control piston 170 is displaceable between two positions, one of which permits flow from the annular groove 173, through an outlet port 174 to the conduit 45, and the other of which permits flow from the annular groove 173 through a port 176 in the housing to the conduit 35. When the piston 170 is in the position wherein the conduit 45 is pressurized, an annular groove 177 and a passageway 178, in the piston 170, permit flow from the conduit 35 through a port 175 to a low pressure return source. When the piston 170 is displaced to permit pressurization of conduit 35, the end of piston 170 uncovers port 174 to permit flow of fluid from conduit 45 through the port 175 to the low pressure return source.

The piston 170 is displaced by differential pressure variations in chambers 179, 181, formed on opposite sides of a flange 182 which is integral with the piston 170 and displaceable in an enlarged portion of the bore 171. The chamber 181 is formed in part by an end cap 183, secured to the housing 80. The chamber 179 is supplied with constant pressure fluid from conduit 73 through a passageway 184 in the piston 170. An orifice 185 formed in the flange 182 provides a bleed flow path from the chamber 178 to the chamber 181. A passageway 186 and a discharge port 187 provide a flow path from the chamber 181 to a chamber 188 in the interior of housing 80, which is connected to a suitable low pressure return source through passageways 189, 191 (FIGURE 3).

Flow from the port 187 is permitted or blocked to respectively displace the piston against the end cap 183 or the base of the enlarged portion of the bore 171, by a plunger 192, integral with a reset piston 193. The reset piston 193 is displaceable in a sleeve 194, secured in the housing 80 by an end cap 195. An adjustable stop 196 limits the displacement of the piston 193 away from the discharge port 187. The reset piston 193 is displaced by pressure variations in chambers 197, 198 formed on opposite sides thereof. The chamber 198 is supplied with constant pressure fluid from the annular groove 173 through a passageway 201 and an annular groove 202, formed in the sleeve 194. An orifice 200 in the piston 193 provides a bleed flow path from the chamber 198 to the chamber 197. A port 203 and an annular groove 204 in the sleeve 194 permit fluid flow from the chamber 197 through a passageway 205 to a discharge port 206. Flow from the discharge port 206 to the chamber 188 is permitted or blocked to respectively displace reset piston 193 against stop 196 or against the discharge port 187 by a plate 207 connected to a lever 208. One end of the lever 208 is displaceable in a groove 209 formed in the housing 80 and the opposite end is pivotally secured to the plunger 192 of the reset piston 193. A follower 211, secured to the lever 208, intermediate its ends, engages a camming surface 212 on an arm 213 which is bolted to the annulus metering valve piston 54 (FIGURE 3). The follower 211 is held against the camming surface 212 by a spring 214 which acts on the lever 208 and an access cap 215, secured to the housing 80.

The camming surface 212 is contoured so that linear and rotational displacement of the metering valve pistons 53 and 54 causes the follower 211 to be linearly displaced proportional to both rotational and linear inputs to pistons 53 and 54 as will be further explained hereinafter.

Reference is now had to FIGURE 7 which shows the after burner fuel control initiation system 67. The afterburner fuel control initiation system 67 comprises a valve element 220 rotatable in a sleeve 221 which is secured in the housing 80. The valve 220 receives a rotary input from the power lever 31 through a suitable mechanical connection. A shaft 222 extends from the end of the valve 222 and has secured thereto a pair of cams 223, 224 and the fuel control input cam 116 (also seen in FIGURE 3).

An inlet passageway 225 in the housing 80 permits flow of constant pressure fluid from the conduit 71 to an annular chamber 226 formed in the sleeve 221. A port 227 in the sleeve 221 provides a flow path from the annular chamber 226 to an arcuate groove 228 in the valve element 220, whenever the power lever 31 is advanced to the angle calling for afterburner operation. A longitudinal groove 229, formed in the valve element 220, connects the arcuate groove 228 and an annular groove 231. A series of ports 232 and an annular chamber 233 permit flow of fluid between the annular groove 231 and a passageway 234 in the housing 80. A passageway 235 provides a flow path from the arcuate groove 228 to the low pressure chamber 110 in the housing 80. The valve element 220 is illustrated in a non-afterburnering position in which groove 228 bleeds line 234 to low pressure as last described.

The passageway 234 extends to a valve assembly 236, used to control the operation of the switching valve 72 and the core metering valve ΔP controller 61. The valve assembly 236 comprises a valve element 237 displaceable in a sleeve 238 which is secured in the housing 80 by means of an end cap 239. The passageway 234 extends to a recess 241 in the end cap 239 which forms, in cooperation with an enlarged diameter piston 242 of the valve element 237, a chamber 243. The opposite end of the valve element 237 forms, in cooperation with the sleeve 238, a chamber 244. A passageway 245 provides a flow path for constant pressure fluid from the main fuel control 24 via the conduit 50 to the chamber 244. A bore 246 and radial ports 247 in the valve element 237 connect the chamber 244 to an annular groove 248. A series of ports 249 permit flow of fluid from the annular chamber 248 to an annular outlet chamber 251 formed in the sleeve 238, whenever the piston 242 is displaced against a shoulder 250 formed in the sleeve 238 by pressurizing passageway 234. The annular chamber 251 has connected thereto the conduits 68 and 73 which respectively extend to the core metering valve differential pressure controller 61 and the pump switching signal valve 72. A series of ports 252 in the sleeve 238 permit flow of fluid from the annular chamber 251 to an annular groove 253, formed in the valve element 237, whenever the piston 242 is displaced against the end cap 239 by depressurization of passageway 234. A series of radial ports 254, 255 and a longitudinal passageway 256, formed in the valve element 237, connect the annular groove 253 with an annular groove 257 formed between the valve element 237 and the piston 242. A series of radial ports 258 extend from the annular groove 257 to an annular outlet chamber 259 which is connected to a suitable low pressure return source by a passageway 261.

An additional flow path to the low pressure return source is provided from the inlet passageway 38 of the afterburner fuel control 39 by a passageway 262 which extends to an annular chamber 263 formed in the sleeve 238. Radial ports 264, and an annular groove 266, connect the annular chamber 263 to the low pressure passageway 256 whenever the piston 242 is displaced against the end cap 250.

A valve assembly 267 is provided to permit operation of the annulus differential pressure controller 62. The valve assembly 267 comprises a valve element 268 displaceable in a sleeve 269 which is secured in the housing 80 by an end cap 271. The valve element 268 has integral therewith a piston portion 277 which is displaceable between the end cap 271 and a shoulder 270 of the sleeve 269, by pressure variations in chambers 276 and 273, formed on opposite sides of the valve element 268. A port 289 through the shoulder 270 and annular chamber 290 and passageway 292 provide a flow path for leakage fluid to a low pressure return source. A passageway 272 extends from the constant pressure fluid supply conduit 50 to the chamber 273 and a bleed orifice 274 provides a flow path from the chamber 273 to a passageway 275 which extends to the chamber 276. A passageway 278 extends from the chamber 276 to a discharge port 279 in the low pressure return chamber 110. Flow from the port 279 is permitted or blocked to respectively displace the valve element 268 against the end cap 271 or against the shoulder 270 by a plate 281 secured to the end of a pivotally mounted lever 282. A follower 283 on the lever 282 is urged against the cam 224 by a spring 284. The cam 224 is contoured to permit displacement of the plate 281 towards the port 279 to block flow only when the power lever angle is such that annulus fuel flow is scheduled across the metering valve piston 54.

A series of ports 287 connect the chamber 273 with an annular groove 288 formed in the valve element 268. A port 285, formed in the sleeve 269, provides a flow path from the groove 288 to an annular chamber 286 when the piston portion 277 is displaced against the shoulder 270. The conduit 69 extends from the annular chamber 286 to the annulus differential pressure controller 62.

The afterburner fuel control initiation system 67 may be also used to provide auxiliary control signals. As previously stated, the engine 10 has a variable area exhaust nozzle 21. It is generally necessary to provide a flow of cooling air to the nozzle during conditions of high afterburner fuel flow rates. For this purpose, a valve 293 is interposed in a conduit 294 which extends from a suitable source of cooling air, such as the compressor 11 of engine 10, to the variable area exhaust nozzle 21 (FIGURE 1). The valve 293 is closed when a constant fluid pressure signal is transmitted thereto from a conduit 295 and opened when the conduit 295 is depressurized.

The conduit 295 extends to a pasageway 296 which is connected at one end to the pressurized chamber 273 through a bleed orifice 291. The opposite end of passageway 296 extends to a discharge port 297 in the low pressure return chamber 110. A plate 298, secured to the end of a pivotally mounted lever 299, is normally urged against the port 297 by a spring 301 (portions of which are shown). A follower 302 on the lever 299 rides on the cam 223 which is contoured to displace the lever 299 away from port 297 and causes conduit 295 to be depressurized to permit cooling air flow only when the power lever angle is above a level where nozzle cooling is desired.

The afterburner fuel control initiation system 67 additionally performs the function of limiting afterburner fuel flow to a minimum level when the variable area exhaust nozzle 21 is in a minimum area position, as during aterburner initiation. For this purpose, a conduit 304 extends from a bleed orifice 305 in the sleeve 269 to provide a flow path for fluid from chamber 273 to a remote discharge port 306. A flapper 307 is maintained against the discharge port 306, by suitable means, to block flow and maintain the pressure therein at the level of chamber 273. When the nozzle area is at a minimum, the flapper 307 is displaced from the port 306 to depressurize conduit 304.

A passageway 308 extends from conduit 304 to a chamber 310 formed on one side of a piston 309 of the previously mentioned valve assembly 121. When the conduit 304 is pressurized, the pressure force in chamber 310 overcomes the force of a spring 311 acting on the opposite side of piston 309 to displace the piston 309 against a stop 312, thus displacing the plunger 119 away from button 118 to permit normal displacement of lever 112 by rotational displacement inputs from cam 116. When conduit 297 is depressurized, the spring 311 displaces the piston 309 so that the plunger 119 engages button 118. The lever 112 is pivoted away from the lower lever input cam 116 so that the power lever input to the metering valve pistons 53, 54 (FIGURE 3) is at a minimum level regardless of the power lever position.

In operation, when the power lever 31 is at an angle, which is below that calling for afterburner operation, the valves 220, 236, 267 are in the positions illustrated in FIGURE 7. The depressurization of conduit 73 by valve 236 causes valves 44 and 34 to be maintained in a closed position, thus preventing flow of fuel to the afterburner fuel control 39. The inlet passageway 38 of the afterburner fuel control 39 is also bled to the low pressure return source by valve 236 to prevent pressurization of the upstream side of the metering valve 49 if either of the valves 44 or 34 should leak. At the same time, the valves 236 and 267, respectively, cause the conduits 68 and 69 to be depressurized which maintains the throttle valves of the differential pressure controllers 61, 62 in closed positions, thereby further preventing flow of fuel to the afterburner fuel nozzles 19, 20.

When the power lever 31 is advanced beyond the angle calling for afterburner operation, the valve 220 is rotated so that chamber 243 of valve 236 is pressurized, if line 71 is pressurized indicating engine speed to be at a maximum. The piston 242 is displaced against the shoulder 250 which causes the bleed flow from inlet passageway 38 to be blocked and causes conduits 73 and 63 to be pressurized. The pressurization of conduit 73 enables the pump switching signal valve 72 to select operation of the main or afterburner fuel pumps 22, 34 in a manner later discussed in detail in connection with the operation of the metering pistons 53, 54. The pressurization of conduit 63 activates the throttle valve of the core differential pressure controller 61 to open and variably restrict the flow through outlet passageway 47 to maintain a constant pressure differential across the core metering valve piston 53.

As previously stated, when the exhaust nozzle 21 is in a minimum area condition, the afterburner fuel flow is limited to a relatively low level by the valve assembly 121. The purpose of this is to minimize the rapid increase in engine thrust which occurs at the moment of afterburner light-off, especially if the power lever is rapidly advanced from a non-after-burner position to a full power position.

When the power lever is advanced to the position wherein annulus afterburner fuel flow is required, the cam 224 allows the plate 281 to restrict flow from the port 279, thereby causing displacement of piston 277 against the shoulder 270 to permit pressurization of conduit 69, flow of fuel to conduit 52 and operation of the annulus differential pressure controller 62.

As the power lever 31 is progressively advanced, during afterburner operation, the fuel flow to the afterburner fuel nozzles 19, 20 is scheduled as follows. Referring particularly to FIGURES 3, 4 and 5, the power lever input cam 116 is rotated by the power lever 31. The rotation of cam 116 causes the flapper valve 107 to restrict the flow from the port 106. When the port 106 is restricted, the pressure in chamber 96 tends to approach the pressure in chamber 95. Since the effective area in chamber 96, over which the pressure acts, is greater than that in chamber 95, the piston 100 will be displaced to open the metering valve assembly 46. As the piston 100 strokes to a more open position, the plunger 93 is displaced away from the flapper valve 107 to reduce the restriction to flow out the port 106 and lower the pressure in chamber 96. When the pressure in chamber 96 has lowered so that a force balance exists on opposite sides of the piston 100, the piston 100 will be stabilized at the desired displacement.

At the same time, the piston 100 may receive a rotational displacement input from the piston 127. Variations in the compressor discharge pressure as sensed by sensor 29 are transmitted to the bellows 161 (FIGURE 5). An increase in the compressor discharge pressure expands the bellows 161 to pivot the arm 156 and rotate the power stream nozzle 144. The power stream discharged from the nozzle 144 then impinges to a greater extent on the receiver passageway 151 which pressurizes the chamber 135 to a higher level than the pressure in chamber 136. The piston 127 and gear tooth 131 are thus displaced to the right thereby rotating the sector gear 108 and the piston 100. As the piston 127 is displaced to the right, it exerts a feedback force on the lever 164 through the spring 165 proportional to the displacement of the piston 127 which nulls out the deflection of the power stream nozzle 144 by the deflection of the compressor discharge pressure bellows. As a result, the power stream nozzle 144 will reach its neutral position when the piston 127 is displaced so that a force balance exists between the bellows 161 and the spring 165. The spring 166 is a relatively weak spring which merely serves as a force level adjustment to position piston 127.

Thus, it can be seen, that the piston 100 is linearly displaced by power lever movements and rotated by compressor discharge variations. The area of the rectangular variable area orifices, formed by the ports 56 and notches 57 is then a function of both the power lever angle and the compressor discharge pressure, and preferably represents a multiplication of these two parameters. The ports 56 and 57 are shaped so that the resultant fuel flow to the afterburner fuel nozzle is as shown in FIGURE 2.

Figure 2:
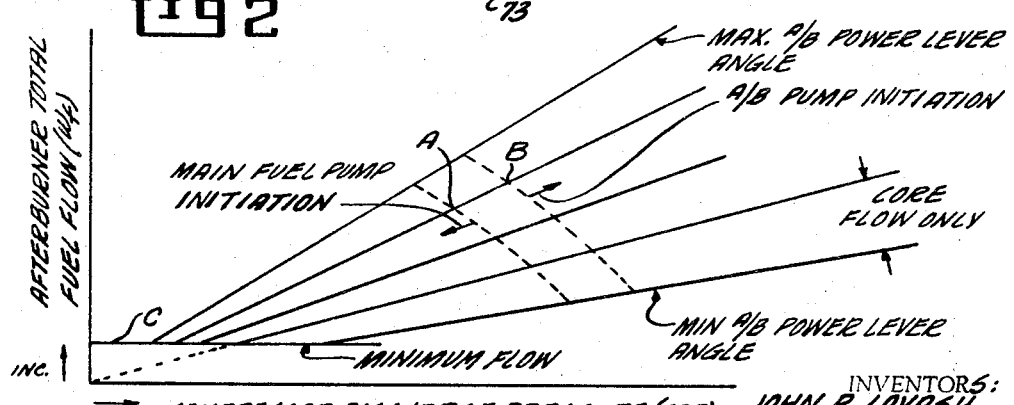
FIGURE 2 shows typical operational characteristics of the fuel control system shown in FIGURE 1.

FIGURE 2 illustrates a plot of the afterburner total fuel flow ($W_f$) versus the compressor discharge pressure (CDP). A family of curves representing increasing power lever angle is placed on the graph. For a given power lever angle, an increase in compressor discharge pressure will cause the total fuel flow to the afterburner to increase along the line representing that power lever angle.

The ports 56 and notches 57 are positioned so that at power lever angles below a predetermined position, the flow to the afterburner is entirely through the core fuel nozzles 19 to insure stable burning at low flow rates. When moved beyond this position, the annulus metering port is open to permit increasing flow to the annulus fuel nozzles 20. The maximum power lever angle schedules maximum flow to the annulus and to the core fuel nozzles.

With the above arrangement, there is an absolute minimum flow level (line C) which is necessary to be scheduled by the afterburner fuel control 39 to insure proper distribution of fuel between the plurality of fuel nozzles and maintain proper combustion. It is apparent from the figure that for a given power lever angle, a substantial reduction in compressor discharge pressure would cause the flow to go beneath the absolute minimum flow level. When the compressor discharge pressure is decreased and piston 127 (FIGURES 3, 4, 5) displaced to call for a scheduled flow that is beneath the minimum level, the upper limit of the metering piston travel is controlled to provide a corresponding increase in fuel flow. This is accomplished by the follower 124 traveling down the rise 130 of cam 125. The arm 123 is progressively displaced to restrict the flow out of port 106. The piston 100 is then linearly displaced to a position wherein the flow is maintained at the minimum level necessary for proper fuel distribution.

It has been explained that the metering valve assembly 46 and the metering valve actuator 58 schedule the flow to the afterburner fuel nozzles as a function of power lever angle and compressor discharge pressure of the engine 10. In addition, the flow to the afterburner nozzles is limited to a predetermined absolute minimum value so that at all times proper fuel distribution is maintained between nozzles.

For purposes of explanation, the manner in which the pump switching signal valve 72 operates will be discussed relative to a condition in which the flow to the afterburner 18 increases from a low level wherein the flow is supplied from the main fuel pump 22 to a higher level requiring supply from pump 32. The augmenter initiation system has pressurized line 73 and chamber 179 of the control piston 170 (FIGURE 6) and chamber 198 of the reset piston 193. Follower 211 is positioned so that lever 208 is in a position wherein plate 207 blocks flow through the bleed orifice 206 and plunger 192 prevents flow from the discharge port 187. The control piston 170 is then maintained in its left position, thereby allowing flow of constant pressure fluid from the conduit 73 to the conduit 45. Flow valve 44 is therefore open to allow flow to the afterburner fuel control 39 from the main fuel pump 22 and valve 34 is closed to prevent flow from the afterburner pump 32 as required for low afterburner flow rates.

When demanded flow to the afterburner 18 increases beyond a predetermined minimum value, the resultant rotational and/or linear displacement of cam 212 will pivot lever 208 clockwise as shown in FIGURE 6. Flow from the chamber 197 is then permitted thus causing displacemnt of reset piston 193 against stop 196 to permit flow from the discharge port 187 and displacement of the control piston 170 to the right so conduit 35 is pressurized and conduit 45 is depressurized. The valve 44 is then closed to terminate flow of fuel from the main fuel pump 22 to the afterburner 18 and the valve 34 is opened to establish flow from the afterburner fuel pump 32 for high afterburner fuel flow rates.

It should be noted that when the reset piston is displaced against stop 196 to initiate pump switching, the lever 208 is pivoted about the follower 211 to further displace the plate 207 from the port 206. Therefore, when the fuel flow requirements of the afterburner 18 decreases from the high level, switching from operation on pump 32 to pump 22 will take place at a lower value than the previously stated minimum. This is so because the follower 211 must be displaced a greater distance to the left to enable blockage of port 206 and pressurization of conduit 44 to permit operation on pump 22. If fuel flow then increases, the switching will again take place at the first mentioned minimum fuel flow because the reset piston has been placed in its original position.

Thus, it can be seen that an overlap zone exists in which operation of the afterburner 18 may be on the main pump 22 or the afterburner fuel pump 32 depending upon the direction in which the fuel flow is changing. This enables stabiilzation of the pump switching by preventing a rapid oscillation from one pump to the other if the fuel flow is at a switchover point.

Thus, during a take-off maneuver of an aircraft, powered by the engine 10, full thrust from the engine 10 is required and the maximum attainable fuel flow is scheduled to the main gas generator 17 and the afterburner 18. This is due to the fact that the power lever angle is maximum and the mass air flow through the engine is maximum. A maximum mass air flow causes the main fuel control 24 to schedule the maximum attainable fuel flow to the nozzles 14 so that the engine speed is maintained at its maximum level. In addition, the mass air flow rate, as reflected by the compressor discharge pressure, causes the afterburner fuel control to schedule a maximum attainable fuel flow to the afterburner fuel nozzles 19 and 20.

During this maximum flow condition, the pump switching valve 72 causes the afterburner fuel pump 32 to supply the afterburner 18 while the fuel pump 22 supplies the main gas generator 17. The fuel pumps 22 and 32 are sized so that they have a capacity at least sufficient to supply the fuel requirements of the engine 10 which is driving the pumps at their maximum rotational speed.

When the aircraft is in high speed cruise at an operational altitude, the aircraft thrust requirements may still be such that afterburner operation is required. The power lever angle is then above the level calling for afterburner operation, thus calling for a maximum thrust output from the main gas generator. However, since the density of the atmosphere at altitude is substantially less than that near ground elevation, the air mass flow through the engine is substantially decreased. As a result, the fuel flow to the main fuel nozzles 14 is significantly lower than the flow during takeoff. In addition, the fuel flow to the afterburner fuel nozzles 19, 20 is lower than the flow for the same power lever angle at takeoff. At this point, the pump switching signal valve 72, in response to displacement inputs from the metering valve assembly 46, causes valve 34 to be shut off and valve 44 to be opened, thereby allowing flow from the main fuel pump 22 to the afterburner fuel control 39 and terminating flow from the afterburner fuel pump 34. As a result, the flow output of the main fuel pump 22, which is substantially maximum due to maximum engine rotor speed, supplies the flow requirements of both the main gas generator 17 and the afterburner 18. Thus, the excess output of the main fuel pump 22 is made available for use by the afterburner 18 and the centrifugal afterburner pump 32 is only operated under its most efficient conditions, namely high flow rates. This minimizes pressurization and greatly reduces the heat input to the fuel which enhances its ability to function as a cooling medium.

One of the advantages of utilizing the three-dimensional camming surface 212 to provide a demanded fuel flow displacement input for pump switching is that the camming surface 212 may be contoured in relation to the follower 211 to set the flow rates at which pump switching takes place as functions of the throttle angle and compressor discharge pressure to enable more efficient utilization of the pumps 22, 32. Referring again to FIGURE 2, it will be remembered that for any given power lever setting, afterburner fuel flow decreases as a function of compressor discharge pressure or air flow through the engine. This same relationship applies to the fuel supplied by the main fuel control to the main combustor 14. The main fuel pump, therefore, has a progressively increased capacity of excess fuel available for diversion to the afterburner.

The contour of cam 212 thus takes into account the following factors:

(a) The actual fuel requirements of the afterburner represented by the power lever angle and compressor discharge pressure and (b) The excess fuel capacity of the main pump 22 which progressively increases as compressor discharge pressure decreases.

By effectively utilizing this excess capacity of the main pump 22, both of the pumps 22 and 32 are most efficiently utilized. This is illustrated in FIGURE 2 by the switching line B. The line B illustrates the conditions beyond which the afterburner fuel flow demand exceeds the excess available fuel capacity of the main pump 22. Fuel flow requirements above this point and for any increases in compressor discharge pressure require that the afterburner fuel be supplied by pump 32.

However, a relatively small decrease in compressor discharge pressure significantly reduces the amount of fuel required by the main combustor, and it will be seen that the excess fuel from the main pump 22 enables that pump to supply both main and afterburner fuel as indicated by the line A which is displaced to the left of line B to illustrate the overlap band for pump switching.

Therefore, it can be seen that the use of the three-dimensional cam as a control input for pump switching enables maximum utilization of pump 22 and minimum utilization of pump 32. This greatly reduces excess heat input to the fuel and enables its efficient use as a heat exchange medium.

The described invention is a highly effective afterburner fuel control system which may be used with particular advantage in gas turbine engines. While the preferred embodiment of the present invention has been described, it is to be understood that modifications will occur to those skilled in the art without departing from the spirit of the invention.

Accordingly, the scope of the invention is to be defined solely from the following claims.

Having thus described the invention, what is claimed as novel and desired to be secured by the Letters Patent of the United States is:

1. In a gas turbine engine having an air flow path through a compressor, combustor and afterburner, a fuel control system comprising:
   first fuel pressurizing means,
   means for scheduling fuel from said first fuel pressurizing means to said combustor,
   second fuel pressurizing means,
   means for scheduling fuel to said afterburner,
   means, operative upon initiation of afterburner operation, for connecting said first pressurizing means to said afterburner fuel scheduling means at low combined combuster and afterburner flow requirements and connecting said second pressurizing means to said afterburner fuel scheduling means at high combined fuel requirements,
   whereby the amount of fuel pressurized by said second pressurizing means is minimized.

2. Apparatus as in claim 1 wherein said engine has a rotor and said first pressurizing means comprises:
   a pump driven by said rotor and having an output proportional to the rotational speed of said rotor,
   valve means for throttling a portion of the output of said pump to a low pressure point to maintain the pressure input to said fuel scheduling means at a desired level,
   whereby the amount of fuel throttled by said valve means is minimized by diverting the output of the pump to said afterburner fuel scheduling means at low combined fuel requirements and particularly at high rotor speeds.

3. Apparatus as in claim 2 wherein the engine is operated at an altitude and the rate of operation is controlled by movement of a power lever and wherein;
   said combustor fuel scheduling means controls the flow of fuel to said combustor to maintain a predetermined rotor speed as a function of power lever position, the amount of fuel required for a given rotor speed decreasing as a function of altitude and reduced air flow through the engine,
   said afterburner fuel scheduling means controls the flow of fuel to said afterburner proportional to power lever position and the fluid flow through said engine, the amount of fuel flow to said afterburner decreasing as a function of altitude and reduced air flow through the engine,
   said connecting means switches the second pressurizing means to said afterburner fuel scheduling means as a function of both afterburner fuel flow and the air flow through said engine,
   whereby operation of said first pump for supplying said main fuel and said afterburner fuel scheduling means may be maximized.

4. Apparatus as in claim 3 wherein said afterburner fuel scheduling means comprises:
   passageway means providing at least one flow path through said afterburner fuel scheduling means to said afterburner,
   metering valve means displaceable in said passageway means for forming a variable area orifice proportional to the product of the power lever position and the air flow through said engine, thereby controlling flow of fuel to said afterburner,
   said connecting means comprises:
   valve means for selectively providing flow paths from said pump and said pressurizing means to said passageway means,
   means responsive to a displacement input for selectively actuating said valve means,
   means for providing a linear displacement input to said selective actuating means proportional to the product of the power lever position and air flow through said engine so that when air flow through the engine is low, said valve means will be actuated to provide a flow path from said second pressurizing means at a higher fuel flow rate than when the air flow through the engine is low, whereby the pump may be utilized over a broader range of fuel and air flow rates.

5. Apparatus as in claim 4 wherein;

said valve actuating means includes means for selectively actuating said valve means to provide the flow path from said second pressurizing means at a first fuel flow through said afterburner fuel scheduling means when the fuel flow to said afterburner increases and for selectively actuating the valve means to provide the flow path from said pump to the afterburner fuel scheduling means at a second, lower fuel flow when the flow to said afterburner decreases, whereby the switching of flow from said pump to said pressurizing means is stabilized.

6. Apparatus as in claim 5 wherein;

said metering valve means is linearly and rotatably displaceable to form said variable area orifice, said valve means are normally closed and are opened by a fluid pressure signal, said selective actuating means comprises:

passageway means for providing a flow path for a fluid pressure signal to each of said valve means, control valve means interposed in said pressure signal flow path and displaceable between two positions for selectively permitting flow of pressurized fluid to said valve means, means for displacing said control valve means between said positions in response to the linear displacement input, said linear displacement input means comprises;

cam means extending from said metering valve element and displaceable therewith, follower means abutting said cam means and connected to said control valve displacing means, said follower being linearly displaceable in response to rotational and linear displacement of said metering valve means.

7. Apparatus as in claim 6 wherein said afterburner operation is initiated by movement of said power lever beyond a predetermined position and said fuel control system further comprises:

normally closed throttling valve means interposed in said afterburner fuel scheduling means flow path, said throttling valve means being opened by a fluid pressure signal, and means responsive to movement of said power lever beyond said afterburner initiation position for pressurizing said throttling valve means to permit flow throuhg said passageway only when scheduled by said metering valve means, means responsive to movement of said power lever beyond said afterburner initiation system for supplying pressurized fluid to said selective valve actuating means passageway, thereby permitting selective operation of the afterburner on said pump and said second pressurizing means, whereby flow of fuel to said afterburner is permitted only when operating is initiated.

8. Apparatus as in claim 7 wherein:

said passageway means of said afterburner fuel scheduling means provides first and second flow paths to said afterburner, said metering valve means is positioned to permit flow only through said first passageway from the power lever position initiating afterburner operation to an intermediate position and flow through said first and second passageways for power lever positions above and predetermined intermediate level, said throttling valve means comprises:

throttling valves respectively interposed in first and second passageways, said pressurizing means being adapted to pressurize the throttling valve in said first passageway responsive to movement of said power lever beyond said initiation position and adapted to pressurize the throttling valve in said second passageway responsive to movement of said power lever beyond and intermediate position, whereby fuel is permitted to flow through said first and second passageway only when scheduled by said metering valve means.

9. Apparatus as in claim 8 wherein said engine has a variable area exhaust nozzle for discharge of fluid from said afterburner and said fuel control system further comprises:

conduit means for supplying cooling air to said nozzle, a shut-off valve disposed in said conduit means, means responsive to movement of said power lever to a position wherein said afterburner fuel metering valve means schedules fuel at relatively high rate for opening said valve to permit flow of cooling fluid to said nozzle.

10. Apparatus as in claim 8 wherein said fuel control system further comprises:

means for selectively maintaining said metering valve means in a position which limits fuel flow to said afterburner regardless of the power lever position, means responsive to an area condition of said exhaust nozzle at afterburner initiation for activating said flow limiting means, whereby the increase in engine thrust for afterburner initiation is minimized irrespective of the movement of said power lever.

11. A fuel scheduling unit for an afterburner of a power lever operated gas turbine engine providing a flow path for air through a compressor and combustor, said fuel scheduling unit selectively receiving pressurized fuel from two sources, said fuel scheduling unit comprising:

a housing having an inlet passageway for receiving pressurized fluid and at least one outlet passageway for connection with said afterburner, a chamber connecting said inlet with said outlet passageway, a metering valve element linearly and rotatably displaceable in said chamber for forming with one of said passageways a variable area orifice having an area proportional to the product of the linear and rotational displacement of said valve element, thereby controlling the flow of fuel to said afterburner, means for linearly displacing said metering valve element proportional to the position of said power lever, means for rotatably displacing said metering valve element proportional to the air discharge pressure from said compressor, means responsive to rotation and linear displacement of said metering valve element for generating an output signal to control the source of pressurized fuel supplied to said inlet passageway as a function of the flow through said afterburner fuel scheduling unit.

12. A fuel scheduling unit as in claim 11 wherein said signal generating means comprises:

a control valve means displaceable between two positions, means responsive to displacement of said control valve means between a first and second said position for generating said control output signals for selecting the source of pressurized fuel for said fuel scheduling unit, means for displacing said control valve between said positions in response to a predetermined linear displacement input, means responsive to the linear and rotational displacement of said metering valve element for generating said linear displacement input whereby said control output signals are generated as a function of power lever position and compressor discharge pressure.

13. A fuel scheduling unit as in claim 12 wherein said means for displacing said control valve comprises:

reset valve means displaceable between two positions, means responsive to displacement of said reset valve means between said positions for displacing said control valve element between said first and second positions, a lever pivotally mounted at one end to said reset valve means and extending generally normal to the axis of displacement for said reset valve means, said lever receiving the displacement input from said linear input means intermediate its ends, means responsive to the displacement of the opposite ends of the lever for displacing said reset valve means between said positions, said means being positioned so that a predetermined displacement input in one direction causes the opposite end of said lever to pivot and actuate said reset valve displacement means to displace said reset valve from one position to another, and displace said valve element from said first position to said second position for generating one of said control output signals, said lever being pivoted about said intermediate point by displacement of said reset valve means such that a second predetermined displacement input in the opposite direction causes the free end of said lever to be displaced and said valve element displaced to said first position for generating the other of said output signals, whereby said signal generating means is responsive to a band of displacement inputs.

14. A fuel scheduling unit as in claim 11 further comprising:

means responsive to rotation of said metering valve by a reduction in compressor discharge pressure to a relatively low flow condition for linearly displacing said metering valve to a more open position sufficient to maintain a predetermined minimum fuel flow, whereby the fuel flow scheduled by said metering valve element is limited to a predetermined minimum flow irrespective of reductions in compressor discharge pressure.

15. A fuel scheduling unit as in claim 14 wherein;

said means for linearly displacing said metering valve element comprises:

a control chamber formed in said housing, a piston connected to one end of said metering valve element and displaceable in said chamber, a plunger extending from the end of said piston and out of said chamber to a low pressure chamber, means for pressurizing the end of said chamber opposite that of said plunger, orifice means formed in said piston for providing a bleed flow path from said pressurized end to the opposite end of said chamber, passageway means formed in said plunger for providing a flow path from the opposite end of said chamber to the low pressure chamber, flapper valve means pivotally mounted on said plunger for providing a variable restriction to fluid flow from said passageway to vary the pressure in said opposite end of the chamber, said piston being shaped so that variations in pressure cause said piston to be linearly displaced, means responsive to increasing power lever movements for displacing said flapper valve means toward said passageway to restrict the fluid flow from said passageway such that the metering valve is displaced towards an open position, wherein the movement of the flapper valve means relative to the displacing means maintains a force balance on opposite sides of the piston at a predetermined position proportional to power lever position, said means for rotatably displacing said metering valve comprises:

a piston linearly displaceable proportional to the compressor discharge pressure, gear teeth formed on said piston, gear means secured to said plunger and meshing with said piston gear teeth whereby changes in compressor discharge pressure causes said metering valve element to rotate, said minimum flow means comprises:

a lever pivotally mounted to said housing and having the free end thereof acting against said flapper valve means to restrict flow from said plunger passageway, cam means mounted on said compressor discharge pressure piston and positioned so that at high and intermediate levels of compressor discharge pressure, said cam means urges said lever away from said flapper valve, said cam means having a ramp formed thereon so that at low levels of compressor discharge pressure, said lever urges said flapper valve means to a restricted position, whereby the metering valve element is linearly displaced to maintain a minimum fuel flow.

16. A fuel scheduling unit as in claim 15 wherein;

said power lever responsive means comprises:

a lever pivotally mounted to said housing and urging said flapper valve means towards a restricted position, a cam rotatable in reseponse to increasing power lever movements for allowing said lever pivot and restrict said flapper valve means, said fuel scheduling unit further comprises:

means responsive to initiation of afterburner operation for maintaining said lever at a position relative to said flapper valve means such that the fuel flow scheduled by said metering valve is limited to a relatively low value during afterburner initiation.

17. Apparatus for generating an output signal in response to a band of displacement inputs, said apparatus comprising:

control valve means displaceable between a first position and a second position, means responsive to displacement of said control valve between said first and second position for generating output signals, reset valve means displaceable between two positions, means responsive to displacement of said reset valve means between said positions for displacing said valve element between said first and second positions, a lever pivotally mounted at one end to said reset valve means and extending generally normal to the axis of displacement for said reset valve means, said lever receiving a displacement input intermediate its ends, means responsive to displacement of the opposite end of said lever for displacing said reset valve means between said positions, said means being positioned so that a predetermined displacement input in one direction causes the opposite end of the lever to pivot and actuate said reset valve displacement means to displace said reset valve from one position to another, and displace said valve element from said first position to said second position for generating one of said output signals, said lever being pivoted about said intermediate point by displacement of said reset valve means such that a second predetermined displacement input in the opposite direction causes the free end of said lever to be displaced and said valve element displaced to said first position for generating the other of said output signals, whereby said signal generating apparatus is responsive to a band of displacement inputs.

18. Signal generating apparatus as in claim 17 wherein said apparatus has a housing and wherein;

said control valve means comprises a first chamber formed in said housing and a control valve element displaceable between opposite ends of said first chamber, said reset valve means comprises a second chamber formed in said housing and a reset valve element displaceable between opposite ends of said second chamber, said means responsive to displacement of said reset valve comprises:

means for applying constant pressurizing fluid to one face of said control valve element, means for applying pressurized fluid to an opposite face of said control valve element, means responsive to displacement of said reset valve element for varying the pressure applied to the opposite face of said control valve element so that the control valve element is displaced between said first and second positions, said means responsive to displacement of said lever comprise:

means for applying constant pressure fluid to one face of said reset valve element, means for applying pressurized fluid to an opposite face of said reset valve element, means responsive to displacement of said lever for varying the pressure applied to the opposite face of said reset valve element so that the reset valve element is displaced between said positions.

19. Signal generating apparatus as in claim 18 further comprising:

means for adjusting the displacement limits of said reset valve element, thereby adjusting the pivoting of said lever about its intermediate point, whereby the relative magnitude of said displacement inputs may be adjusted.

20. Signal generating apparatus as in claim 19 in combination with an afterburner fuel scheduling unit having a metering valve element displaceable in opposite direction to control flow of pressurized fuel through said unit wherein;

said lever receives said displacement inputs from said metering valve element, said control output signals are used to control the source of pressurized fuel for said unit, whereby said control signals are generated for different magnitudes of fuel flow depending upon the direction of fuel flow change.

References Cited

UNITED STATES PATENTS

| | | | |
|---|---|---|---|
| 2,987,877 | 6/1961 | Torell | 60—241 XR |
| 3,011,308 | 12/1961 | Wotring | 60—39.28 XR |
| 3,086,581 | 4/1963 | Jay | 60—39.28 XR |

JULIUS E. WEST, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,556            September 24, 1968

John P. Lavash et al.

It is certified that error appears in the above identified patent and that said Letters Patent are hereby corrected as shown below:

Column 15, line 60, "operating" should read -- operation --; line 70, "and" should read -- said --. Column 16, line 4, "and" should read -- said --.

Signed and sealed this 17th day of February 1970.

(SEAL)
Attest:

Edward M. Fletcher, Jr.            WILLIAM E. SCHUYLER, JR.
Attesting Officer                   Commissioner of Patents